United States Patent
Abdel-Hady et al.

(10) Patent No.: US 10,208,984 B2
(45) Date of Patent: Feb. 19, 2019

(54) FOLDABLE PARABOLIC SOLAR COLLECTOR

(71) Applicant: King Abdulaziz University, Jeddah (SA)

(72) Inventors: Faissal Elsayed Abdel-Hady, South Windsor, CT (US); Abdulsalam Saeed Alghamdi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 110 days.

(21) Appl. No.: 15/207,881

(22) Filed: Jul. 12, 2016

(65) Prior Publication Data

US 2018/0017288 A1    Jan. 18, 2018

(51) Int. Cl.
*F24S 23/71* (2018.01)
*F24S 50/60* (2018.01)
*F24S 30/425* (2018.01)
*F24S 40/80* (2018.01)
*F24S 20/50* (2018.01)
(Continued)

(52) U.S. Cl.
CPC ............... *F24S 50/60* (2018.05); *F24S 20/50* (2018.05); *F24S 23/74* (2018.05); *F24S 30/425* (2018.05); *F24S 40/20* (2018.05); *F24S 40/50* (2018.05); *F24S 40/85* (2018.05); *F24S 50/40* (2018.05)

(58) Field of Classification Search
CPC ....................................................... F24J 2/14
See application file for complete search history.

(56) References Cited

U.S. PATENT DOCUMENTS 3,581,830 A * 6/1971 Stoner ................... B23Q 15/12
                                                        173/6
4,122,831 A * 10/1978 Mahdjuri ................ F24J 2/055
                                                       126/657
(Continued)

FOREIGN PATENT DOCUMENTS

WO    WO 2014/007429 A1    1/2014

OTHER PUBLICATIONS

Balayeva et al. (URL http://www.chalcogen.ro/267_BalayevaO.pdf, Accessed May 1, 2018).*

(Continued)

*Primary Examiner* — Gregory Huson
*Assistant Examiner* — Elizabeth M May
(74) *Attorney, Agent, or Firm* — Oblon, McClelland, Maier & Neustadt, L.L.P.

(57) ABSTRACT

A foldable parabolic solar collector includes a first panel having a semi-parabolic reflective inner surface, a central tube to which the first panel is fixed, and a second panel having a semi-parabolic reflective inner surface. The second panel is pivotably mounted to the central tube with the reflective inner surface of the second panel facing the reflective inner surface of the first panel. A receiver tube carries a heat transfer fluid. A tracking motor rotates the central tube. A torque sensor lies in between the tracking motor and the central tube and is configured to measure torque between the tracking motor and the central tube. A servomotor pivots the second panel about the central tube between an open position and a closed position when it is determined by a controller that the torque between the tracking motor and the central tube exceeds a predetermined torque threshold.

17 Claims, 10 Drawing Sheets

(51) Int. Cl.
*F24S 23/74* (2018.01)
*F24S 40/50* (2018.01)
*F24S 40/20* (2018.01)
*F24S 50/40* (2018.01)

(56) References Cited

U.S. PATENT DOCUMENTS

| | | | | |
|---|---|---|---|---|
| 6,662,801 | B2 * | 12/2003 | Hayden | F24J 2/38 |
| | | | | 126/571 |
| 7,878,192 | B2 | 2/2011 | Larsen | |
| 2003/0116154 | A1 * | 6/2003 | Butler | F24J 2/40 |
| | | | | 126/569 |
| 2009/0223510 | A1 * | 9/2009 | Larsen | F22B 1/006 |
| | | | | 126/694 |
| 2011/0061644 | A1 | 3/2011 | Pizzarello et al. | |
| 2011/0067692 | A1 | 3/2011 | Dopp et al. | |
| 2011/0308512 | A1 * | 12/2011 | Nakasato | F24J 2/14 |
| | | | | 126/585 |
| 2016/0169560 | A1 * | 6/2016 | Leberer | F24J 2/07 |
| | | | | 126/714 |

OTHER PUBLICATIONS

EnamelDictionary (URL http://www.dictionary.com/browse/enamel, Accessed May 2, 2018).*

Ted Larsen, "Optimized Solar Collector", ASME 2009 3$^{rd}$ International Conference on Energy Sustainability Collocated With the Heat Transfer and INTERPACK09 Conferences, vol. 2, Jul. 19-23, 2009, pp. 589-595 (Abstract only).

Soteris A. Kalogirou, "Solar thermal collectors and applications", Progress in Energy and Combustion Science, vol. 30, 2004, pp. 231-295.

* cited by examiner

1100

FOLDABLE PARABOLIC SOLAR COLLECTOR

BACKGROUND

Field of the Disclosure

The present disclosure relates to renewable energy technology and solar thermal energy collection systems, and specifically relates to parabolic solar thermal collectors.

Description of the Related Art

A parabolic trough collector uses a mirror in the shape of a parabolic cylinder to reflect and concentrate solar radiation toward a receiver tube located along the focal line of the parabolic trough. The receiver absorbs the incoming radiation and transforms it into thermal energy, the latter being transported and collected by a heat transfer fluid medium flowing within the receiver tube. This method of concentrated solar collection has the advantage of high efficiency and low cost, and can be used either for thermal energy collection or generating electricity, or both. It is an important way to exploit solar energy directly in many fields, including in the field of water desalination.

The parabolic trough can be used for large scale exploitation of solar energy. However, the high installation cost is a challenge of the current parabolic trough technology. Also, many of these plants are installed in desert locations where sand storms and dust can cause major harm to the reflective materials, either glass mirrors or polymeric mirror-like coatings.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

This disclosure is drawn to a foldable parabolic solar collector including a first panel having a semi-parabolic shape and a first reflective inner surface, a central tube to which the first panel is fixed, and a second panel having a semi-parabolic shape and a second reflective inner surface. The second panel is pivotably mounted to the central tube with the second reflective inner surface of the second panel facing the first reflective inner surface of the first panel. A hollow receiver tube is disposed between the first panel and the second panel, and the hollow receiver tube is pivotably mounted to the central tube and is configured for carrying a heat transfer fluid. A tracking motor is coupled to the central tube and is configured to rotate the central tube. A torque sensor is positioned between the tracking motor and the central tube and is configured to measure a torque between the tracking motor and the central tube. A servomotor is connected to the central tube and the second panel, and is configured to pivot the second panel about the central tube.

A controller having processing circuitry is configured to control the tracking motor to direct an axis of symmetry passing through the central tube and the hollow receiver tube toward a position of the sun, and receive torque data from the torque sensor and determine a torque between the tracking motor and the central tube. The controller controls the servomotor to cause the second panel to pivot between an open position, in which the first panel and the second panel form a substantially parabolic shape with the hollow receiver tube disposed along a focal line of the parabolic shape, and a closed position, in which the second panel and the first panel substantially enclose the hollow receiver tube, when it is determined by the controller that the torque between the tracking motor and the central tube exceeds a predetermined torque threshold.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
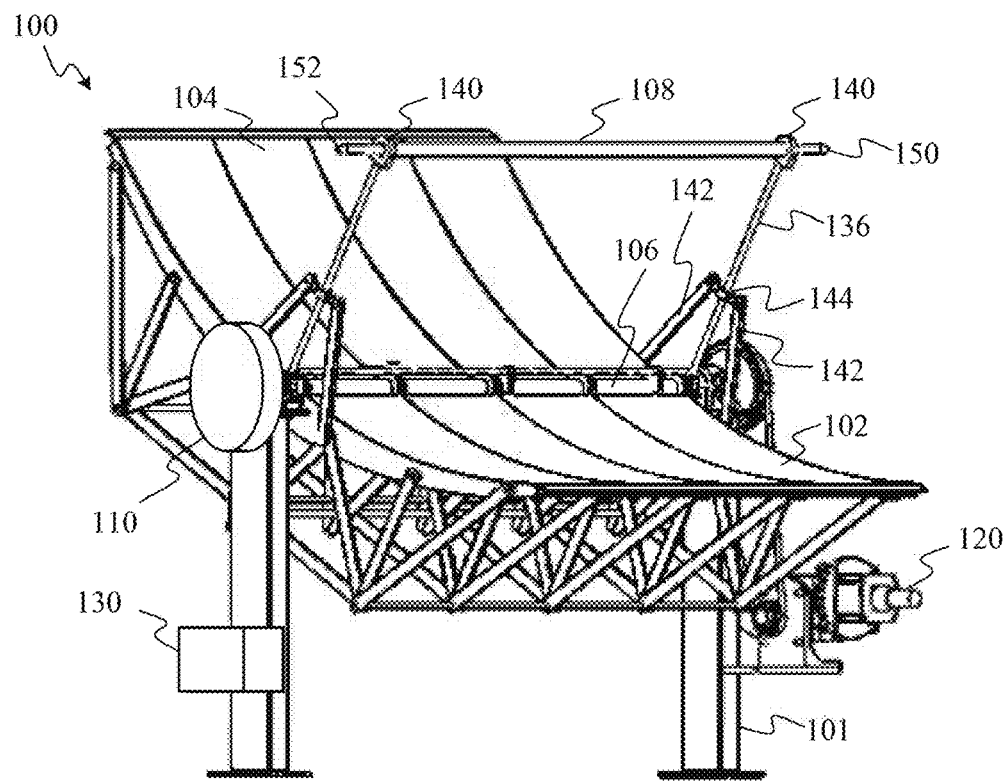
FIG. 1 illustrates a perspective view of an exemplary parabolic solar collector according to an embodiment.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

In the interest of clarity, not all of the features of the implementations described herein are shown and described in detail. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A parabolic solar collector includes a central tube mounted between two side supports. In an example, the central tube is a stainless steel tube. The central tube and the side supports constitute the frame to support the remaining components of the parabolic solar collector. The frame supports a spray system, two parabolic reflectors, a receiver assembly, and a drive mechanism.

Two parabolic reflector halves are mounted on the central tube. One of the halves of the collector is fixed, while the other half is free to rotate about the central tube. This provides a simpler design since gears are not required to fold two halves of the parabolic trough. Instead, just one set of gears is required to fold the rotatable half. Each of the halves of the collector is made of a highly reflective polymeric sheet glued against a stainless steel sheet. The stainless steel sheet is mounted onto a web of links to provide structural rigidity.

The composite reflector halves form a full parabolic trough when in the open position. The receiver assembly is positioned in the focal line of the collector when the collector is in the fully open position. The inclination of the collector is controlled by a drive mechanism. The drive mechanism includes a motor with a gear reduction unit, which is connected to the central tube. Further reduction can be provided by a chain or a synchronous belt.

The receiver assembly carries a heat transfer fluid. The receiver assembly also includes a stainless steel pillow at one end of the central tube to compensate for thermal expansion. The central tube is coated with a tough black enamel coating, designed for high heat conditions. The central tube and pillow are enclosed within a glass tube.

The receiver assembly is sealed after removing the air to create a vacuum environment. The receiver assembly is mounted to the central tube, via supports to ensure the collector is positioned along the focal line in the fully extended open position and is parallel to a longitudinal axis of the parabolic trough.

In a first embodiment, a foldable parabolic solar collector includes a first panel having a semi-parabolic shape and a first reflective inner surface, a central tube to which the first panel is fixed, and a second panel having a semi-parabolic shape and a second reflective inner surface. The second panel is pivotably mounted to the central tube with the second reflective inner surface of the second panel facing the first reflective inner surface of the first panel. A hollow receiver tube is disposed between the first panel and the second panel, and the hollow receiver tube is pivotably mounted to the central tube and configured for carrying a heat transfer fluid. A tracking motor is coupled to the central tube and is configured to rotate the central tube. A torque sensor is positioned between the tracking motor and the central tube, and is configured to measure a torque between the tracking motor and the central tube. A servomotor is connected to the central tube and the second panel, and is configured to pivot the second panel about the central tube.

In the first embodiment, a controller has processing circuitry and is configured to control the tracking motor to direct an axis of symmetry passing through the central tube and the hollow receiver tube toward a position of the sun, and receive torque data from the torque sensor and determine a torque between the tracking motor and the central tube. The controller controls the servomotor to cause the second panel to pivot between an open position, in which the first panel and the second panel form a substantially parabolic shape with the hollow receiver tube disposed along a focal line of the parabolic shape, and a closed position, in which the second panel and the first panel substantially enclose the hollow receiver tube, when it is determined by the controller that the torque between the tracking motor and the central tube exceeds a predetermined torque threshold.

In an aspect of the disclosure, a first light sensor is disposed on the first reflective inner surface, the first light sensor being configured to measure first solar irradiance corresponding to incident solar irradiance on the first reflective inner surface of the foldable parabolic solar collector. The controller is further configured to receive the first solar irradiance data from the first light sensor, and control the servomotor to cause the second panel to pivot from the open position to the closed position when the first solar irradiance data is below a first predetermined solar irradiance threshold.

In an aspect of the disclosure, a second light sensor is disposed on a back side of the foldable parabolic solar collector, the second light sensor being configured to measure second solar irradiance corresponding to incident solar irradiance on the back side of the foldable parabolic solar collector. The controller is further configured to receive second solar irradiance data from the second light sensor, and control the servomotor to cause the second panel to pivot from the closed position to the open position when the second solar irradiance data is above a second predetermined solar irradiance threshold.

In an aspect of the disclosure, a first temperature sensor is disposed at a first end of the hollow receiver tube, the first temperature sensor being configured to measure a first temperature corresponding to an outlet temperature of the heat transfer fluid. The controller is further configured to receive first temperature data from the first temperature sensor, determine the outlet temperature of the heat transfer fluid from the first temperature data, and control the servomotor to cause the second panel to pivot from the open position to the closed position when the outlet temperature of the heat transfer fluid exceeds a predetermined outlet temperature threshold.

In an aspect of the disclosure, a second temperature sensor is disposed at a second end of the hollow receiver tube, the second temperature sensor configured to measure a second temperature corresponding to an inlet temperature of the heat transfer fluid. The controller is further configured to receive second temperature data from the second temperature sensor, determine the inlet temperature of the heat transfer fluid from the second temperature data, and control the servomotor to cause the second panel to pivot from the open position to the closed position when a difference between the outlet temperature and the inlet temperature of the heat transfer fluid is below a predetermined temperature threshold.

In an aspect of the disclosure, an electronically-actuatable valve is disposed at an end of the central tube, a pressure rail is connected to the electronically-actuatable valve to allow liquid to flow from the electronically-actuatable valve to the pressure rail, and a plurality of openings along the pressure rail are configured to spray a liquid onto the first reflective inner surface of the first panel and the second reflective inner surface of the second panel. The controller is further configured to actuate the electronically-actuatable valve.

In an aspect of the disclosure, the hollow receiver tube is enclosed in a glass tube with a space between the hollow receiver tube and the glass tube, and the space between the hollow receiver tube and the glass tube is air evacuated and sealed, and the hollow receiver tube is coated with an enamel having an absorptivity of at least ninety percent for solar radiation.

In an aspect of the disclosure, the enamel has a wavelength between 0.25 microns and 6 microns.

In an aspect of the disclosure, a plurality of first panels is fixed to the central tube, and a plurality of second panels is pivotably mounted to the central tube.

In an aspect of the disclosure, the plurality of first panels and the plurality of second panels comprise sheets mounted via a web of structurally-rigid links.

In an aspect of the disclosure, the torque determined between the tracking motor and the central tube is measured via a current feedback from the tracking motor.

In a second embodiment, a method of collecting solar energy includes determining a local latitude, longitude, date, and time at a location of a foldable parabolic solar collector, and calculating sunset and sunrise times at the location of the foldable parabolic solar collector. The method also includes determining whether a given time is between the sunset and sunrise times via a light sensor, and calculating a plurality of sun angles and associated foldable parabolic solar collector positions when the given time is between the sunset and sunrise times. The method also includes tracking, via a tracking motor, a position of maximum sunlight exposure according to the calculated plurality of sun angles and associated foldable parabolic solar collector positions. The method also includes driving, via the tracking motor, the foldable parabolic solar collector to a home tracking position when the sunset time occurs. The method also includes closing, via a servomotor connected to a central supporting axis and a first panel of the foldable parabolic solar collector, the second panel against the first panel of the foldable parabolic solar collector when a wind tracking event is detected by a torque sensor.

In an aspect of the disclosure, the method further includes collecting the solar energy, via a receiver assembly positioned at a focal line of the foldable parabolic solar collector when the foldable parabolic solar collector is in a fully open position.

In an aspect of the disclosure, the method further includes closing the second panel against the first panel of the foldable parabolic solar collector when an outlet temperature of a heat transfer fluid from the receiver assembly exceeds a predefined temperature threshold.

In an aspect of the disclosure, the method further includes closing the second panel against the first panel of the foldable parabolic solar collector when the outlet temperature of the heat transfer fluid is equal to an inlet temperature of the heat transfer fluid for a predefined time period.

In an aspect of the disclosure, the wind tracking event is detected when a given torque, measured between the tracking motor and the central supporting axis of the foldable parabolic solar collector, is greater than a predefined torque.

In an aspect of the disclosure, the wind tracking event is detected when a feedback current from the tracking motor, as measured by the torque sensor, is greater than a predefined current.

In an aspect of the disclosure, the method further includes determining whether a given time is between the sunset and sunrise times, via a first light sensor located on a reflective surface of the foldable parabolic solar collector and a second light sensor located on a back side of the foldable parabolic solar collector.

In an aspect of the disclosure, the method further includes cleaning, via a spray cleaning assembly, a reflective surface of the foldable parabolic solar collector when the foldable parabolic solar collector is in a closed mode at a predetermined time.

In a third embodiment, a foldable parabolic solar collector includes a means of determining whether a given time is between a sunset time and a sunrise time at a location of the foldable parabolic solar collector, and a means of tracking a position of maximum sunlight exposure for the given time according to a plurality of calculated sun angles and associated foldable parabolic solar collector positions. The foldable parabolic solar collector also includes a means of driving the foldable parabolic solar collector to a home tracking position when the sunset time occurs, and a means of detecting a wind tracking event upon the foldable parabolic solar collector. The foldable parabolic solar collector also includes a means of closing a second panel against a first panel of the foldable parabolic solar collector when one of i) the sunset time, ii) the wind tracking event, iii) an outlet temperature of a heat transfer fluid from a receiver assembly of the foldable parabolic solar collector exceeds a predefined temperature threshold, and iv) the outlet temperature of the heat transfer fluid is equal to an inlet temperature of the heat transfer fluid for a predefined time period, occurs.

In an exemplary aspect of the disclosure illustrated in FIG. 1, the foldable parabolic solar collector 100 includes two halves of a parabola or parabolic trough, formed by a first panel 102 and a second panel 104, which are mounted on a hollow central shaft 106 located at the vertex of the parabola formed by the first panel 102 and the second panel 104. The first panel 102 and the second panel 104 each have reflective surfaces on a side toward the centers of curvature, and can be constructed as single panels or can be formed of two or more sections. The reflective surfaces of the panels can be formed using highly reflective polymeric sheets glued against stainless steel backings, e.g., utilizing a multi-layered polymeric mirror film, metallic layers deposited on lightweight substrates, and the like. The first panel 102 is fixed to the central shaft 106, so that when the central shaft 106 is rotated, the first panel 102 rotates with the shaft. The second panel 104 is coupled to the central shaft 106 so as to be rotatable or pivotable about the central shaft 106, independent of the motion of the central shaft, via mechanical bearings, hinges, and the like.

Incident light from the sun arrives at the parabolic solar collector 100, via substantially parallel rays. When the parabolic solar collector is pointed toward the sun, the parabolic shape formed by the first panel 102 and the second panel 104 reflects and focuses the incoming parallel rays from the sun onto a receiver tube 108, which absorbs the incident radiation.

The receiver tube 108 is rotatably mounted on the central shaft 106 via two guide rods 136, and is held in place by two receiver supports 140. The receiver tube 108 comprises a hollow stainless steel tube coated with a hardened black enamel high-heat coating enclosed in a glass tube. A heat transfer fluid is carried within the hollow stainless steel tube. The receiver tube 108 can also be configured with a stainless steel pillow at one end to compensate for thermal expansion. The receiver tube 108 and pillow, if equipped, are enclosed by the glass tube from which the air is evacuated. The receiver tube 108 is sealed after the removal of the air, creating a vacuum environment, which thermally insulates the receiver tube 108.

The focused sunlight directed on the receiver tube 108 by the first panel 102 and the second panel 104 is absorbed by the receiver tube 108. The heat transfer fluid contained in the receiver tube 108 acts as a storage medium for thermal energy transferred from the walls of the receiver tube 108. The heat transfer fluid is circulated through the system to a heat exchanger, for example, which can be used as a water heater, to generate steam to drive a steam turbine and generate electricity, and the like. The lines or pipes for carrying the heat transfer fluid between the parabolic solar collector 100 and the rest of the system are not illustrated.

The location of each guide rod 136 is controlled by two receiver-connecting links 142. Each receiver-connecting link 142 pivots on the first panel 102 or the second panel 104 at one end, and pivots on a slider block 144 on the guide rod 136 at the other end. The receiver tube 108 maintains a central position between the first panel 102 and the second panel 104 as a result of the two receiver-connecting links 142 and the slider block 144.

A first temperature sensor 150 is disposed at an outlet of the receiver tube 108, and a second temperature sensor 152 is disposed at an inlet of the receiver tube 108. The temperature sensors are used to determine the outlet and inlet temperatures, respectively, of the heat transfer fluid. In the fully extended, or open mode of the two halves, the receiver tube 108 will occupy a location of a focal line of the parabolic trough.

This design ensures protection of the mirrored surfaces from dust and sand storms during the day, and protection during the night when the parabolic solar collector 100 is not in use. This is achieved by a closed mode with the two halves of the parabolic solar collector 100 enclosing the receiver tube 108 between them.

The parabolic solar collector 100 includes a frame 101, made of a durable material, such as stainless steel or the like, which supports the other components of the parabolic solar collector 100. The collector is reinforced by a tress structure to increase its rigidity. The inclination of the parabolic solar collector 100 is controlled by a tracking motor 120 fixed to the frame 101. The tracking motor 120 includes a gear reduction unit and is connected to the central shaft 106, with further reduction provided by a chain or a synchronous belt. When the parabolic solar collector 100 is set up for use, the frame 101 will generally be aligned along a north-south direction, and the tracking motor 120 will control the east-west inclination of the parabolic solar collector 100, such that the parabolic solar collector 100 is pointing toward the sun as the sun moves across the sky.

A servomotor 110 is fixed to an end of the central shaft 106. The servomotor 110 rotates with the central shaft 106 as the central shaft is rotated by the tracking motor 120. The servomotor 110 is connected to the second panel 104, and is configured to rotate or pivot the second panel 104 about the central shaft 106.

An electronic control unit (ECU) 130 is fixed to the frame 101 for automated operation of the parabolic solar collector 100. The ECU 130 monitors the various sensors of the parabolic solar collector 100 and controls the servo and tracking motors according to the sensor readings. The functions of the ECU 130 are described in greater detail herein with reference to FIG. 10.

Figure 2:
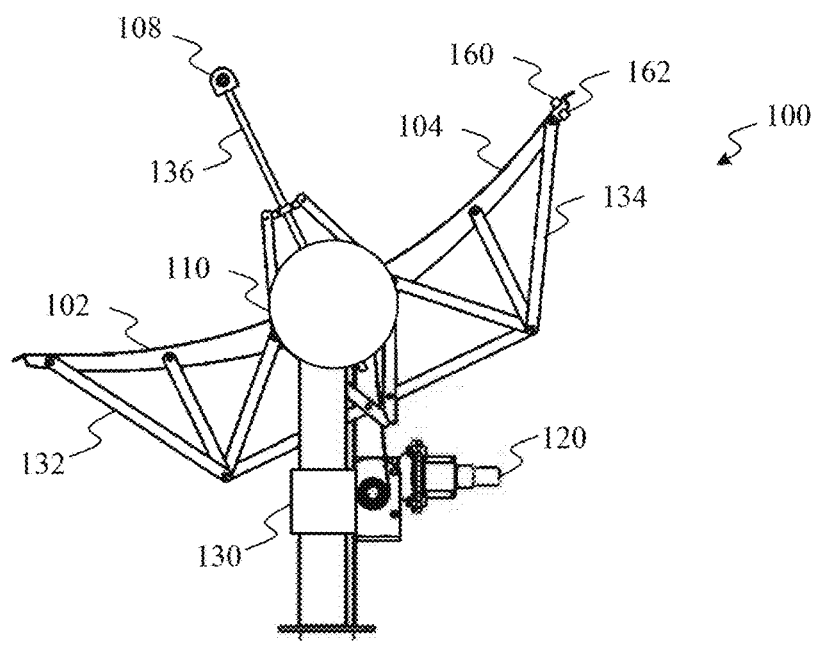
FIG. 2 illustrates a side view of an exemplary parabolic solar collector in an open position according to an embodiment.

FIG. 2 illustrates a side view of the parabolic solar collector 100 in an exemplary aspect of the disclosure. The first panel 102 and the second panel 104 are supported by a first link support 132 and a second link support 134, respectively. The link supports 132 and 134 provide the structural rigidity needed for the first panel 102 and the second panel 104.

The parabolic solar collector 100 is equipped with a first light sensor 160 on a front side of the parabola, and a second light sensor 162 on a back side of the parabola. The first light sensor 160 is configured to detect an intensity of solar radiation incident on the first and second panels 102 and 104 when the parabolic solar collector 100 is in an open position. The second light sensor 162 is configured to detect an intensity of solar radiation when the parabolic solar collector 100 is in the closed position.

Figure 3:
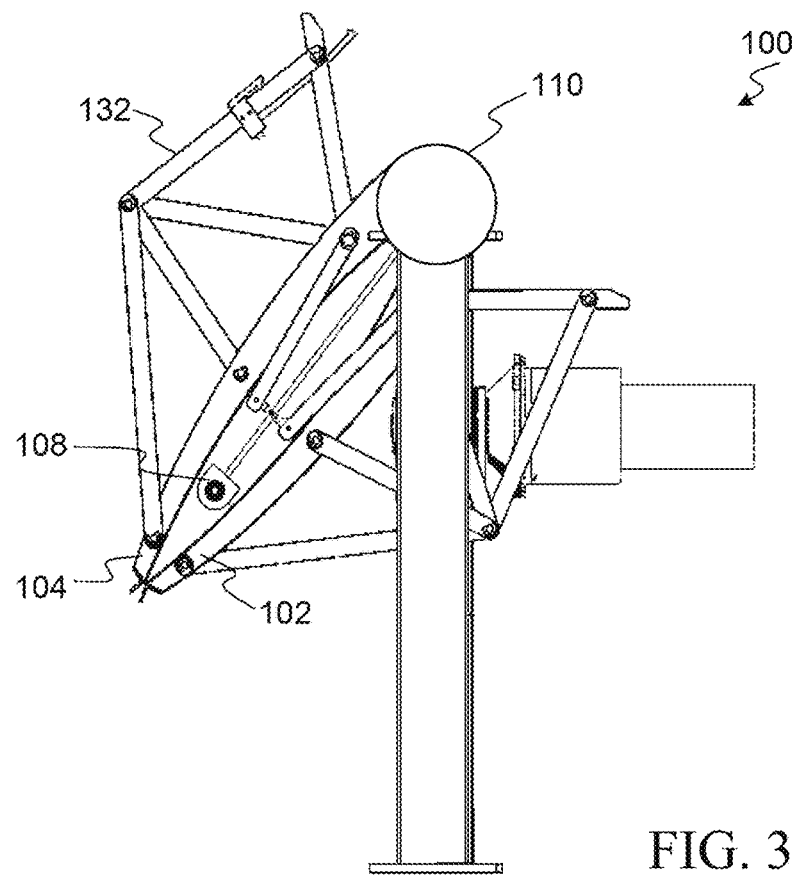
FIG. 3 illustrates an exemplary parabolic solar collector in a closed position according to an embodiment.

FIG. 3 illustrates the closed position of the parabolic solar collector 100 in an exemplary aspect of the disclosure. In the closed position, the servomotor 110 has rotated the second panel 104 so that the second panel 104 and the first panel 102 substantially enclose the receiver tube 108.

Figure 4A:
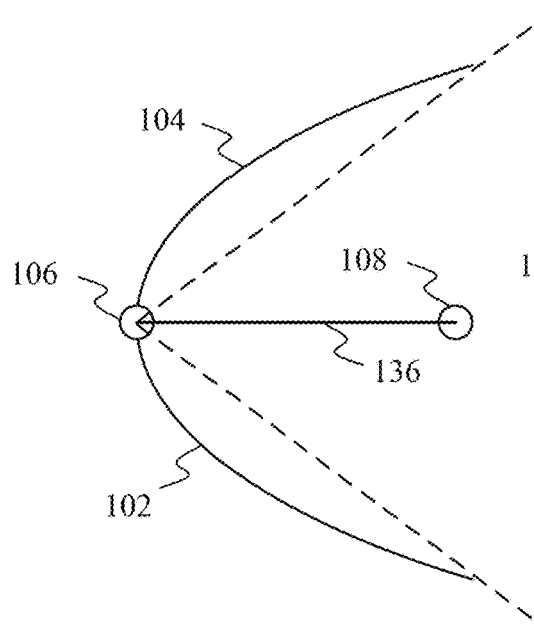
FIG. 4A illustrates a geometry of a first panel and a second panel in an open position according to an embodiment.

FIG. 4A shows a geometry of the first panel 102 and the second panel 104 in the open position. The first panel 102 and the second panel 104 form a substantially parabolic shape in the open position, with the central shaft 106 at the vertex of the parabola. The receiver tube 108 is held at the focus of the parabola by the guide rods 136, which lie one behind the other in the view of FIG. 4A.

Figure 4B:
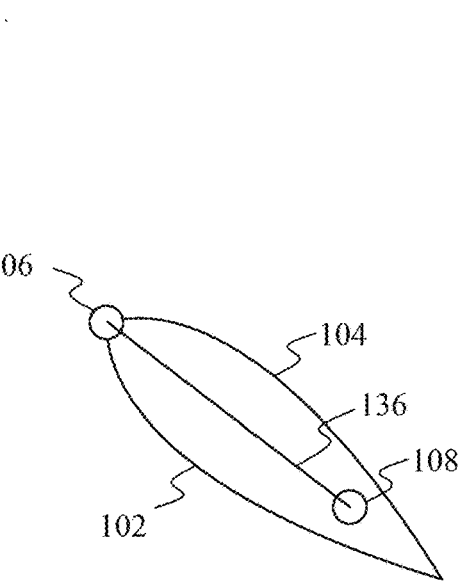
FIG. 4B illustrates a geometry of a first panel and a second panel in a closed position according to an embodiment.

To move to the closed position shown in FIG. 4B, the servomotor 110 rotates the second panel 104 on the central shaft 106, moving the second panel 104 downward so that the first panel 102 and the second panel 104 substantially enclose the guide rods 136 and the receiver tube 108, which remain in a central position between the first panel 102 and the second panel 104 as the second panel 104 moves.

Figure 5:
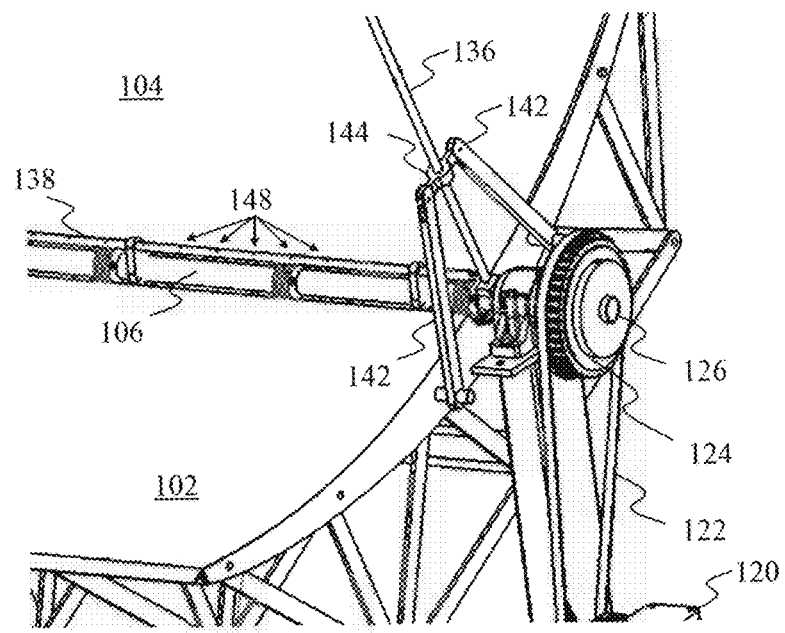
FIG. 5 illustrates a perspective view of a portion of a parabolic solar collector according to an embodiment.

FIG. 5 illustrates a perspective view of a portion of the parabolic solar collector 100 in an exemplary aspect of the disclosure. Two connecting links 142 are pivotably mounted to the first panel 102 and the second panel 104 at one end, and to the slider block 144 at the other end. The guide rod 136 is rotatable mounted at an end of the central tube 106, for example, via a ball or roller bearing, and the slider block 144 is free to slide on the guide rod 136. The connecting links 142 and the slider block 144 maintain the central position of the guide rod 136 between the first panel 102 and the second panel 104.

A cleaning system for the parabolic solar collector 100 includes a coupling and electronically-actuated valve 126 located at an end of the central shaft 106. The coupling and electronically-actuated valve 126 are configured to receive pressurized water or liquid cleaning fluid, via a hose or pipe (not pictured), and selectively allow the pressurized water or cleaning fluid into a pressure rail 138, according to whether the valve is open or closed. If the electronically-actuated valve 126 is open, the water or cleaning fluid charges the pressure rail 138.

In order to clean the reflective surfaces of the first panel 102 and the second panel 104, the parabolic solar collector 100 is placed in the closed position, oriented downward as in FIG. 3. The electronically-actuated valve 126 is opened, and the water or cleaning fluid charges the pressure rail 138. A series of jet orifices 148, located along the length of the pressure rail 138 causes the water or cleaning fluid from the pressure rail to spray onto the reflective surfaces of the first panel 102 and the second panel 104. Gravity carries the water or cleaning fluid, along with any contaminates, downward and away from the parabolic solar collector 100.

A hub torque sensor 124 is connected to the tracking motor 120 and to the central shaft 106. The tracking motor 120 is coupled to the hub torque sensor 124 using a chain or belt 122. The hub torque sensor 124 transmits the torque from the tracking motor 120 to the central shaft 106, and also measures torque and relays torque data to the ECU 130. The torque data can be used, for example, to determine whether there is unusually large resistance to turning the central shaft 106, such as a wind causing a large torque to be required to hold the position of the central shaft.

Figure 6:
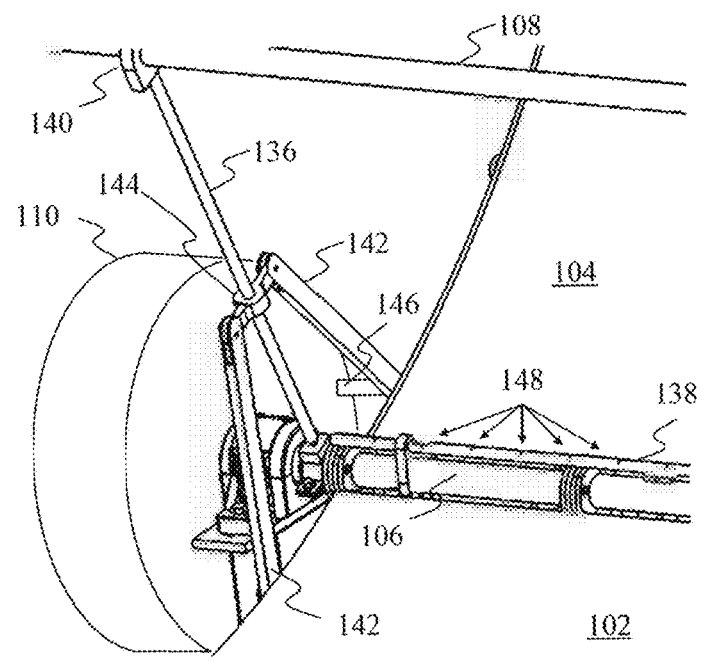
FIG. 6 illustrates a perspective view of a portion of a parabolic solar collector according to an embodiment.

FIG. 6 illustrates a perspective view of a portion of the parabolic solar collector 100 in an exemplary aspect of the disclosure. Two connecting links 142 are pivotably mounted to the first panel 102 and the second panel 104 at one end, and to the slider block 144 at the other end. The guide rod 136 is rotatably mounted at an end to the central shaft 106, for example, via a ball or roller bearing, and the slider block 144 is free to slide on the guide rod 136. The connecting links 142 and the slider block 144 maintain the central position of the guide rod 136 between the first panel 102 and the second panel 104.

The servomotor 110 is fixed to an end of the central shaft 106. The servomotor 110 rotates with central shaft 106 as the shaft is turned by the tracking motor 120. The servomotor 110 is also joined to the second panel 104. For example, the servomotor 110 can be joined to the second panel 104, via a pin 146 or other fastener. The servomotor 110 rotates about the axis of the central shaft 106. The pin 146, or other fastener, causes the second panel 104 to turn with the servomotor 110. Thus, when the servomotor 110 is fixed, the servomotor 110 and the second panel 104 rotate rigidly with the central shaft 106. When the servomotor 110 rotates independently of the central shaft 106, the servomotor 110 rotates the second panel 104 about the central shaft 106 to move the second panel 104 between the open and closed positions.

Figure 7:
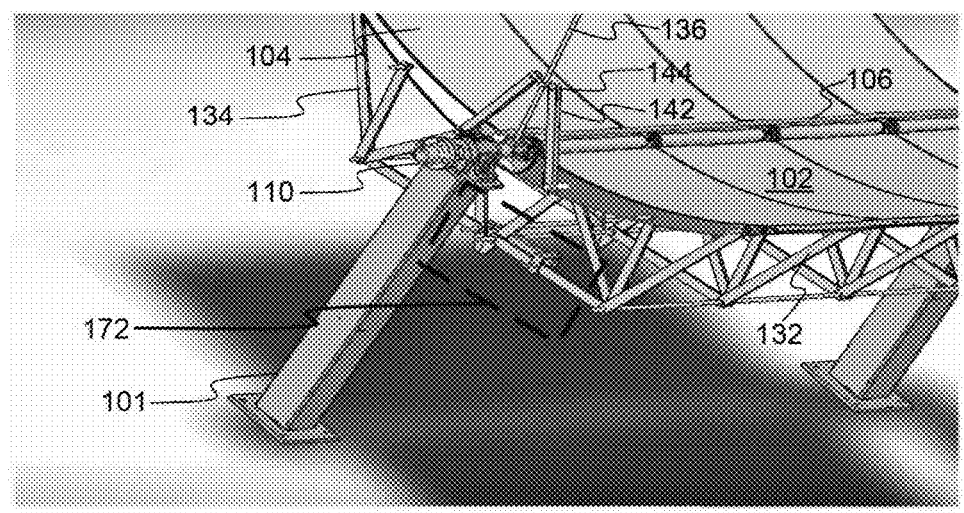
FIG. 7 illustrates a perspective view of a locking mechanism on a parabolic solar collector according to an embodiment.

FIG. 7 illustrates a locking arm 172 used to maintain the open position of the parabolic solar collector 100. When the parabolic solar collector 100 is in a fully open position, the first panel 102 and the second panel 104 are locked into position to maintain the open position.

Figure 8:
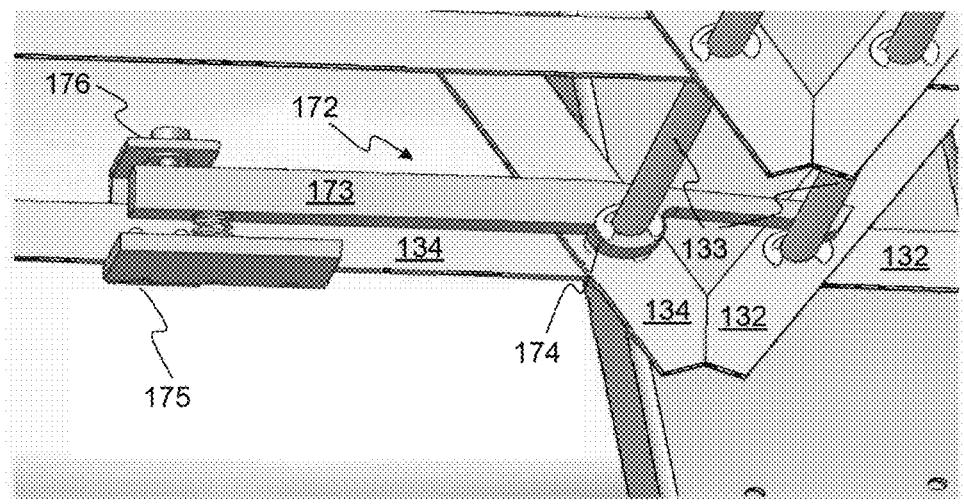
FIG. 8 illustrates a detailed view of a locking mechanism according to an embodiment.

FIG. 8 illustrates a detailed view of the locking arm 172. Two transverse rods 133 extend horizontally from one side of the first panel 102 to the other side of the first panel 102, and from one side of the second panel 104 to the other side of the second panel 104. A locking bar 173 has a locking arm pivot 174, which fits over the two transverse rods 133. This holds the two transverse rods 133 a fixed distance apart and thereby, holds the first panel 102 and the second panel 104 in a fully open position. The locking arm 172 locks the two halves by the locking arm pivot 174, which can be released by an electric solenoid. The solenoid is activated when the closed mode is initiated. FIG. 8 also illustrates a locking spring 175, which pushes the locking arm 172 into a locking position. A locking mechanism release relay 176 controls the locking spring 175 into a locked or unlocked position.

Figure 9:
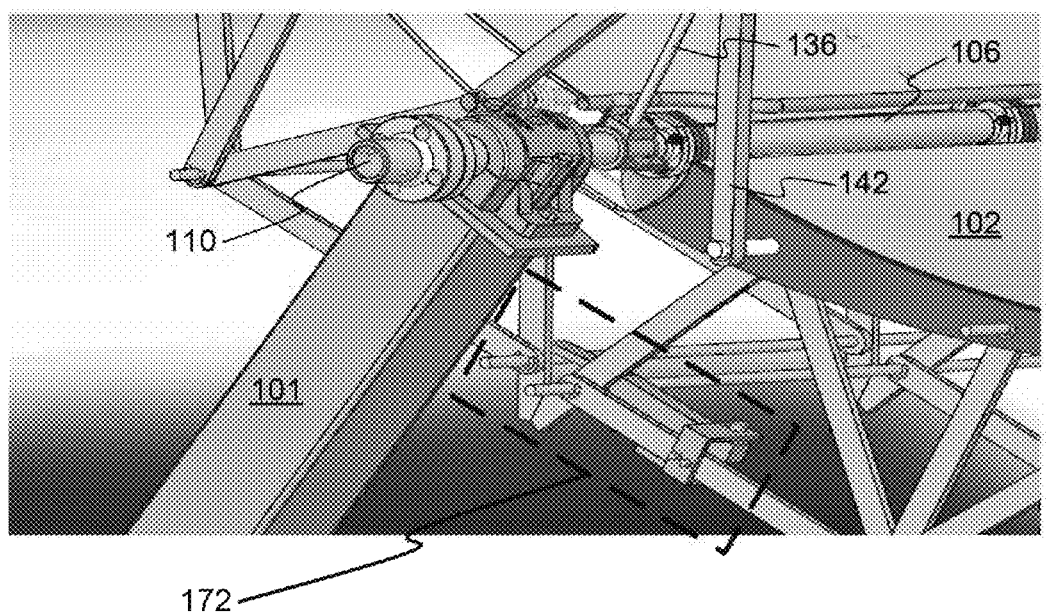
FIG. 9 illustrates a perspective view of a locking mechanism on a parabolic solar collector according to an embodiment.

FIG. 9 illustrates a perspective view of the locking arm 172, relative to the nearby components of the parabolic solar collector 100. FIG. 9 illustrates a fully open position of the first panel 102 and the second panel 104.

Figure 10:
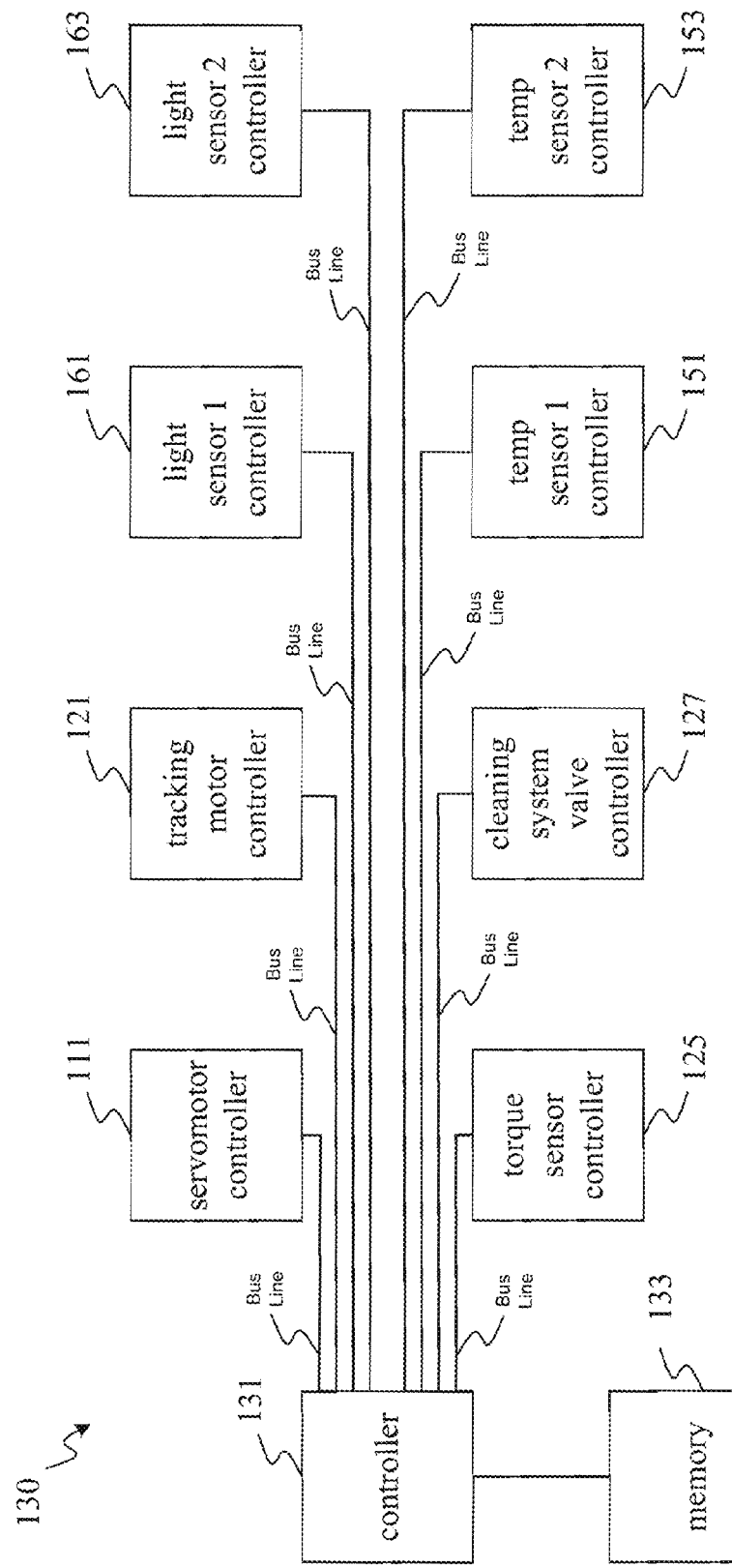
FIG. 10 illustrates an exemplary electronic control unit according to an embodiment.

FIG. 10 illustrates the electronic control unit (ECU) 130 in an exemplary aspect of the disclosure. The ECU 130 includes a controller 131 that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language, and the code may be stored in an electronic memory directly within the FPGA or CPLD, or as a separate electronic memory.

A memory 133 in the ECU 130 can be used by the controller 131 for data logging, storing a computer program or a set of computer-readable instructions, and the like. Further, the memory 133 can be non-volatile, such as ROM, EPROM, EEPROM, or FLASH memory. The memory 133 can also be volatile, such as static or dynamic RAM. A processor, such as a microcontroller or microprocessor, can be provided to manage the electronic memory, as well as the interaction between the FPGA or CPLD and the memory.

The controller 131 in the ECU 130 can execute a computer program including a set of computer-readable instructions that perform the functions described herein, the program being stored in any of the above-described non-transitory electronic memories and/or a FLASH memory, or any other known storage media. Further, the computer-readable instructions may be provided as a utility application, background daemon, or component of an operating system, or combination thereof, executing in conjunction with a controller, such as the ARM Cortex-M by ARM Holdings or the F28M3x MCU by Texas Instruments, a processor, such as a Xenon processor from Intel of America or an Opteron processor from AMD of America and an operating system, such as Microsoft Windows, UNIX, Solaris, LINUX, Apple, MAC-OS, and other operating systems known to those skilled in the art. Further, the controller 131 can be implemented as multiple controllers or processors cooperatively working in parallel to perform the instructions.

The controller 131 is connected to a servomotor controller 111. The servomotor controller 111 actuates the servomotor 110 and receives feedback from the servomotor 110. The servomotor controller 111 is used to cause the servomotor 110 to move the second panel. 104 between the open and closed positions.

A tracking motor controller 121 actuates the tracking motor 120 according to instructions from the controller 131, and receives feedback from the tracking motor. The servomotor controller 121 is used to cause the tracking motor 120 to rotate the central shaft 106, thereby rotating the parabolic solar collector 100 to keep the parabola formed by the first panel 102 and the second panel 104 oriented toward the sun. The exact positioning of the parabolic solar collector 100, via the tracking motor 120 may determined using the latitude and longitude of the parabolic solar collector 100, as well as the time of year, for example, or using a GPS system and data for the solar orbit.

The controller 131 uses a first light sensor controller 161 and a second light sensor controller 163 to determine the solar irradiance incident on the first light sensor 160 and the second light sensor 162, respectively. The first and second light sensor controllers 161 and 163 amplify the analog signals received form the first and second light sensors 160 and 162, and convert them to digital signals. The digital signals are passed to the controller 131. Bus lines connect each of the servomotor controller 111, the tracking motor controller 121, the first light sensor controller 161, and the second light sensor controller 163.

In one aspect of the disclosure, the controller 131 is configured to cause the servomotor controller 111 to drive the servomotor 110, so as to move the second panel 104 from the open position to the closed position when a reading from the first light sensor controller 161 falls below a first predetermined irradiance threshold. The controller 131 causes the servomotor controller 111 to drive the servomotor 110, so as to move the second panel 104 from the closed position to the open position when a reading from the second light sensor controller 163 rises above a second predetermined irradiance threshold. The first and second predetermined irradiance thresholds may be configured to be a same irradiance threshold.

The controller 131 receives torque data from a torque sensor controller 125. The torque sensor controller 125 processes raw torque data from the hub torque sensor 124. The torque sensor controller 125 amplifies the raw torque data received from the hub torque sensor 124 and digitizes the amplified raw torque data to produce the torque data, which is passed to the controller 131.

In one aspect of the disclosure, the controller 131 is configured to cause the tracking motor controller 121 to stop driving the tracking motor 120, if the torque data exceeds a first predetermined torque threshold. In one aspect of the disclosure, the controller 131 is configured to cause the servomotor controller 111 to drive the servomotor 110, so as to move the second panel 104 from the open position to the closed position when a reading from the torque sensor controller 161 exceeds a second predetermined torque threshold. The first and second predetermined torque thresholds may be configured to be a same torque threshold.

The controller 131 interfaces with a cleaning system valve controller 127 which controls the electronically-actuated valve 126. In one aspect of the disclosure, the cleaning system valve controller 127 includes a current booster and controller, and the electronically-actuated valve 126 is a normally-closed solenoid valve. In one aspect of the disclosure, the controller 131 causes the cleaning system valve controller 127 to open the electronically-actuated valve 126 at regular predetermined time intervals.

The controller 131 uses a first temperature sensor controller 151 and a second temperature sensor controller 153 to determine the temperature of the heat transfer fluid at the first temperature sensor 150 and the second temperature sensor 152, respectively. The first and second temperature sensor controllers 151 and 153 amplify the analog signals received form the first and second temperature sensors 150 and 152, and convert them to digital signals. The digital signals are passed to the controller 131. Bus lines connect each of the torque sensor controller 125, the cleaning system valve controller 127, the first temperature sensor controller 151, and the second temperature sensor controller 153.

In one aspect of the disclosure, the controller 131 is configured to cause the servomotor controller 111 to drive the servomotor 110, so as to move the second panel 104 from the open position to the closed position when a reading from the second temperature sensor controller 153 exceeds a predetermined outlet temperature threshold. When the reading from the second temperature sensor controller 153 exceeds a predetermined outlet temperature threshold, it can indicate, for example, that the temperature of the heat transfer fluid has exceeded a safe level.

In one aspect of the disclosure, the controller 131 is configured to cause the servomotor controller 111 to drive the servomotor 110, so as to move the second panel 104 from the open position to the closed position when a difference between a reading from the second temperature sensor controller 153 and the first temperature controller 151 falls below a predetermined temperature threshold for a period of time. When the difference between the reading from the second temperature sensor controller 153 and the first temperature sensor controller 151 falls below a predetermined temperature threshold for a period of time, it can indicate, for example, that the heat transfer fluid is not being heated by the parabolic solar collector 100.

The two symmetric foldable halves of the parabolic solar collector 100 include a fiberglass epoxy structure that forms a parabolic trough, which is mounted on a central stainless steel tube. A first parabolic half is fixed to a shaft of the central stainless steel tube, while a second parabolic half is free to rotate about the shaft of the central stainless steel tube. In a completely open extended position, the two halves form a full parabolic trough with the receiver tube positioned along the focal line, parallel to a longitudinal axis of the parabolic trough.

The receiver tube is coated with a tough enamel that can withstand high temperatures of approximately 1000 degrees F. The absorptivity of the coated receiver for solar radiation having a wavelength of less than six microns is at least ninety percent. The receiver tube can be made of stainless steel having a stainless steel pillow at one end to compensate for thermal expansion. The stainless steel tube and pillow are enclosed with a glass tube, wherein the space between the stainless steel tube and glass tube is air evacuated and sealed.

In another embodiment, a foldable parabolic solar collector includes two halves of parabolic reflectors. When the two halves of parabolic reflectors are in a fully open position, a focal line is formed, which pivots about a central stainless steel tube. A receiver is positioned at the focal line of the opened reflector. The receiver carries a heat transfer fluid.

A rigid base is attached to and supports the central tube. The rigid base also supports other system components, including a heat transfer fluid storage tank, a hydraulic pump, a circulating heat transfer fluid, two fluid temperature sensors to measure the temperature of the heat transfer fluid at the inlet and outlet of the receiver tube, and a tracking system.

The tracking system includes a motor with a gear-reduction unit, which is connected with the central tube through further reduction by a chain or a synchronous belt to adjust an angle of inclination of the reflector. The two temperature sensors are located on opposite sides of the receiver at an inlet position and an outlet position of the receiver.

A current feedback from the motor driver is used as a torque sensor to measure the torque applied on the reflector structure. In the event of high winds, the current feedback will be higher than a normal non-windy day. When the current feedback exceeds a pre-determined level, the foldable parabolic solar collector can be programmed to go to a closed mode in order to avoid damage to the structure, such as the closed position illustrated in FIG. 3. When a wind storm has subsided, the current feedback will go below the predetermined level. At this point, the foldable parabolic solar collector will re-open when conditions are positive for solar collection, such as during daylight hours.

The tracking system also includes a controller, which is configured with processing circuitry to receive signals from the temperature sensors and the current feedback torque sensor. The sensors are connected with the motor to set the reflector angle of the first panel 102 and the second panel 104 to face the sun rays from a sunrise to a sunset time. The angle of the reflectors about the central shaft is calculated, using the latitude and longitude information for the installation location upon the earth.

The controller has two modes of operation, depending upon the different signals received from the sensors. A closed mode exists when the two reflector halves are folded together and have a downward position, relative to the central shaft. The closed mode is activated during night time and when there is a strong blowing wind that exceeds predefined limits. The closed mode is also activated when the outlet temperature exceeds a predefined value, or when the inlet temperature equals the outlet temperature for a certain period of time. When conditions are negative for solar collection, such as conditions described herein, the foldable parabolic solar collector will go into a closed mode and will not continue to track. When conditions become positive for solar collection, the foldable parabolic solar collector will track to a position based on a set time for re-opening during daylight hours.

An open or working mode exists when the two reflector halves are fully opened to form a complete parabola and the receiver tube is in the focal line of the trough. The open mode is activated from a sunrise time to a sunset time when the trough is tracking the sun.

Figure 11:
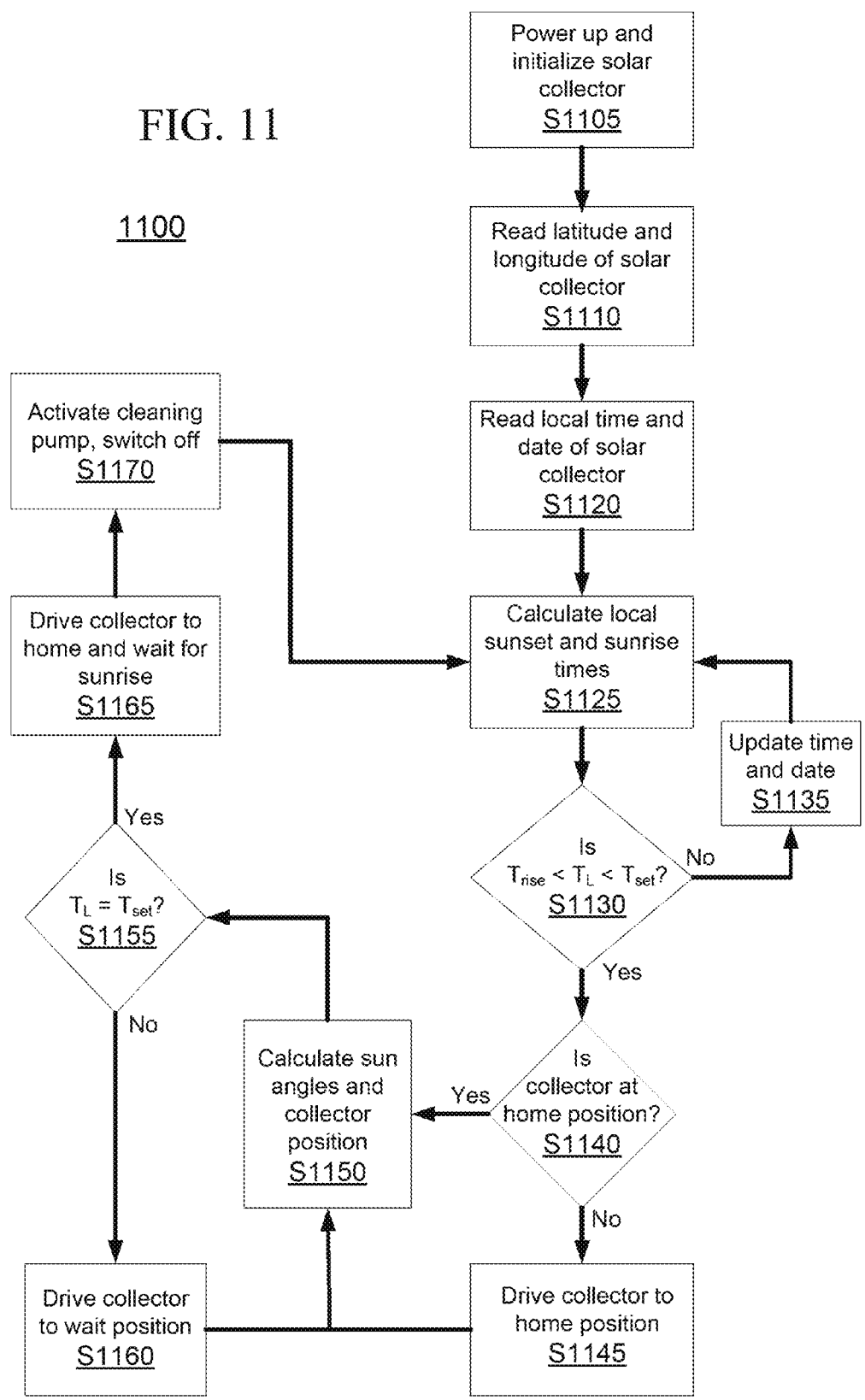
FIG. 11 is an exemplary algorithm for collecting solar energy according to an embodiment.

FIG. 11 is an exemplary algorithm 1100 for collecting solar energy, via a foldable parabolic solar collector, such as parabolic solar collector 100. In step S1105, the foldable parabolic solar collector is powered up and initialized. This can be programmed as a start-up procedure, via the controller 131 of the ECU 130.

In step S1110, the latitude and longitude of the current position of the foldable parabolic solar collector is read. These coordinate positions can be taken from a Guidance Positioning System (GPS) device of the foldable parabolic solar collector. The GPS can either be a separate device or it can be integrated with the foldable parabolic solar collector.

In step S1120, the local time and date corresponding to the position of the foldable parabolic solar collector is read. This can be taken from a clock device of the foldable parabolic solar collector. The clock can either be a separate device or it can be integrated with the foldable parabolic solar collector.

In step S1125, the local sunset and sunrise times are calculated, respectively as $T_{set}$ and $T_{rise}$. This information can be obtained from a local weather agency and programmed, via the controller 131 of the ECU 130.

In step S1130, it is determined whether the local time, $T_L$ is between $T_{rise}$ and $T_{set}$. If $T_L$ is not between $T_{rise}$ and $T_{set}$, (NO at step S1130), the process proceeds to step S1135. In step S1135, the time and date are updated with the local time and date. The process continues back to step S1125.

If $T_L$ is between $T_{rise}$ and $T_{set}$, (YES at step S1130), the process proceeds to step S1140. In step S1140, it is determined whether the foldable parabolic solar collector is at the home position.

If the foldable parabolic solar collector is not at the home position (NO at step S1140), the process proceeds to step S1145. In step S1145, the foldable parabolic solar collector is driven to the home position.

If the foldable parabolic solar collector is at the home position (YES at step S1140), the process proceeds to step S1150. In step S1150, multiple sun angles are calculated with respect to the position of the foldable parabolic solar collector. Step S1145 also proceeds to step S1150 after driving the foldable parabolic solar collector to the home position.

In step S1155, it is determined whether $T_L$ is equal to $T_{set}$. If $T_L$ is not equal to $T_{set}$, (NO at step S1155), the process proceeds to step S1160.

In step S1160, the tracking motor drives the foldable parabolic solar collector to a new position, holds at the new position for one minute, and updates $T_L$ with the new current time. A new position is calculated each minute during daylight hours. As a result, the tracking is executed each minute to the new calculated position. The process then proceeds back to step S1150.

If $T_L$ is equal to $T_{set}$ (YES at step S1155), the process proceeds to step S1165. In step S1165, the tracking motor drives the foldable parabolic solar collector to a home position and waits for the next sunrise time, less a predefined time, such as fifteen minutes.

In step S1170, the cleaning pump is activated for a predefined time, such as five minutes, and switches off. The process proceeds back to step S1125.

Figure 12:
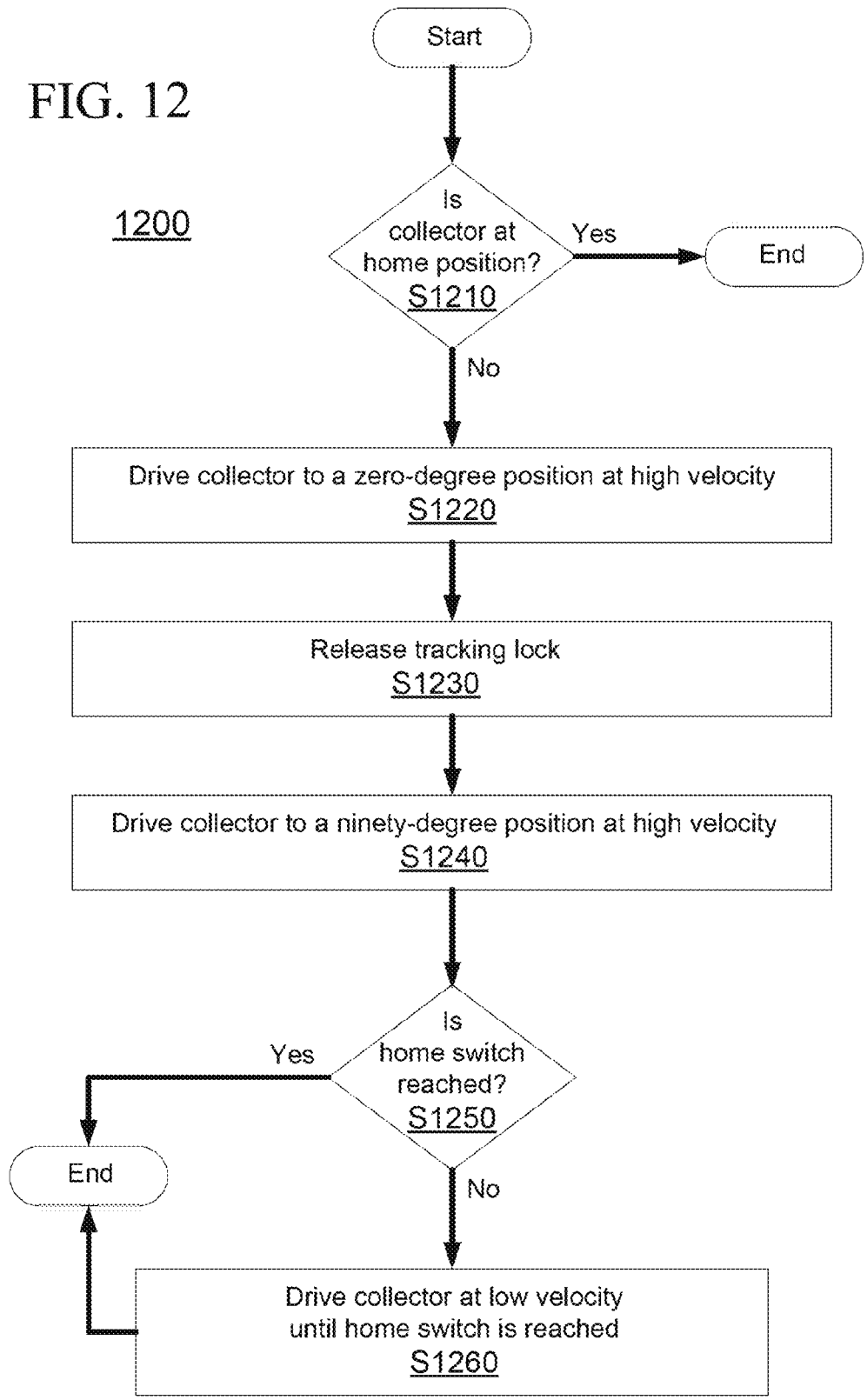
FIG. 12 is an exemplary algorithm for a foldable parabolic solar collector to reach its home position according to an embodiment.

FIG. 12 is an exemplary algorithm 1200 for the foldable parabolic solar collector to reach its home position. Algorithm 1200 is used in conjunction with the steps S1140, S1145, and S1165 of FIG. 11.

In an embodiment, the home position is the smallest or the largest angle of inclination of the foldable parabolic solar collector along its orbital tracking path. In an embodiment, the home position is the position in which the foldable parabolic solar collector is directly facing the sun at sunrise, or the position in which the foldable parabolic solar collector is directly facing the sun at sunset. The tracking motor controller 121 is programmed with the daily times for sunrise and sunset, according to the location of the foldable parabolic solar collector. However, in other embodiments, the home position can be defined as any position desired for the intended purpose, location, and/or circumstances of the foldable parabolic solar collector.

In step S1210, it is determined whether the foldable parabolic solar collector is at the home position. If the collector is at the home position (YES at step S1210), the process ends.

If the collector is not at the home position (NO at step S1210), the process proceeds to step S1220. In step S1220, the motor drives the collector to a zero-degree position at a high velocity. In an embodiment, a zero-degree position is a horizontal position of the foldable parabolic solar collector. A ninety-degree position is a vertical position of the foldable parabolic solar collector facing east. A negative ninety-degree position is a vertical position of the foldable parabolic solar collector facing west. This arrangement orients the foldable parabolic solar collector in a north-south direction.

In step S1230, the locking mechanism release relay 176 is released. In order to move the two halves of the foldable parabolic solar collector together, the locking arm 172 locks the two halves together. The locking mechanism release relay 176 is released to fold the foldable parabolic solar collector to a closed position.

As illustrated in FIG. 8, the locking bar 173 is pivoted onto the movable half of the foldable parabolic solar collector. A groove on the end of the locking bar 173 snaps onto a transverse rod 133 of the movable half. The locking spring 175 pushes the locking bar 173 into a locked position. An electric solenoid relay, such as locking mechanism release relay 176 is used to push the locking bar 173 down and thereby release the locking bar 173.

In step S1240, the driving motor drives the foldable parabolic solar collector to a ninety-degree position at a high velocity.

In step S1250, it is determined whether a home switch is reached. The home switch is normally in an open position when the movable half of the foldable parabolic solar collector reaches its home position and cannot be moved beyond the home position. If the home switch has been reached (YES at step S1250), the process ends.

If the home switch has not been reached (NO at step S1250), the process proceeds to step S1260. In step S1260, the driving motor drives the foldable parabolic solar collector at a low velocity until the home switch is reached. The process ends when the home switch is reached.

Figure 13:
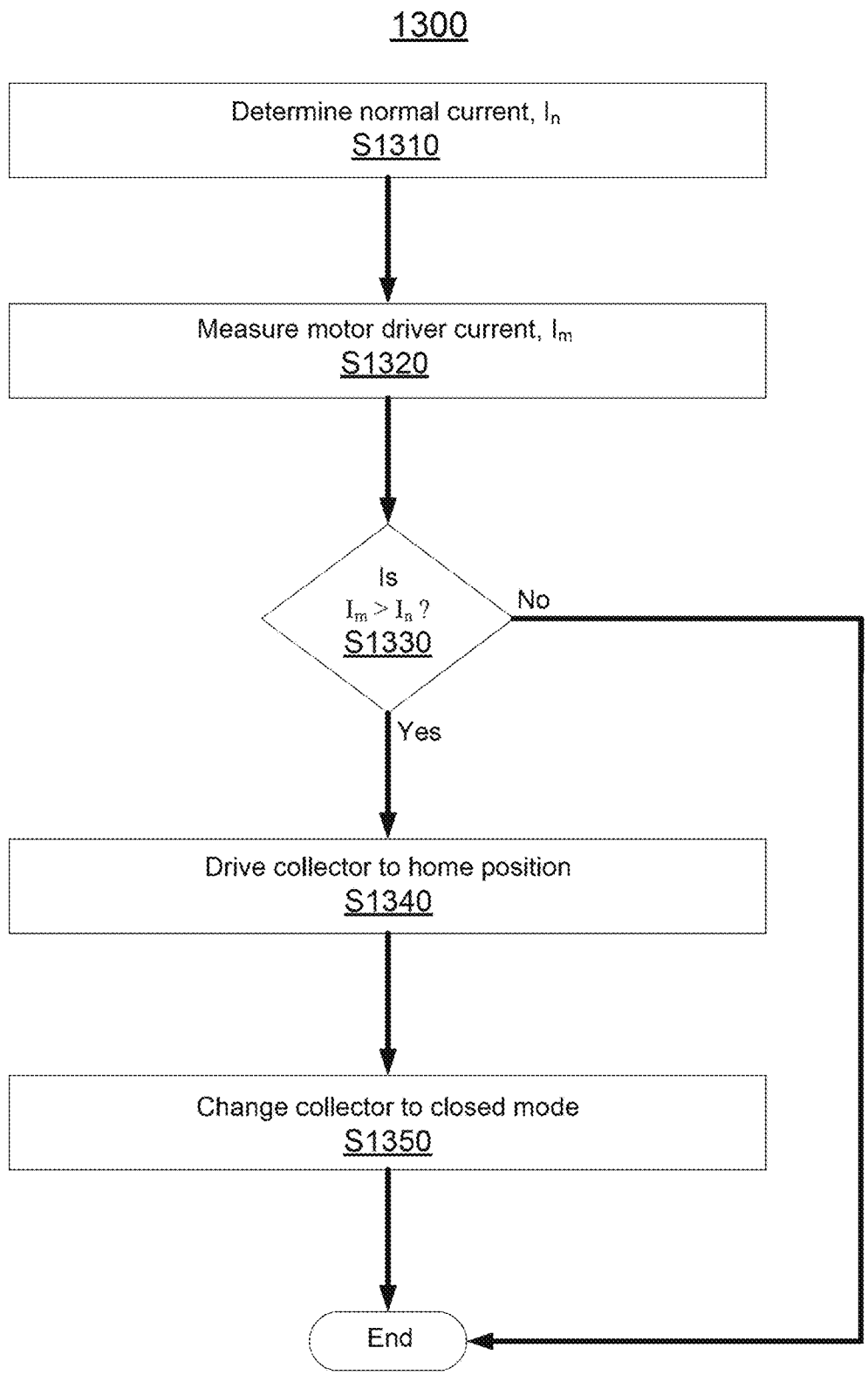
FIG. 13 is an exemplary algorithm for detecting a wind loading event according to an embodiment.

FIG. 13 is an exemplary algorithm 1300 for detecting a wind loading event. When a wind velocity exceeds a certain magnitude, it can cause damage to the foldable parabolic solar collector when it is in a fully open position.

In step S1310, a normal current, $I_n$ used by the motor to drive the foldable parabolic solar collector is determined. In step S1320, an instant current feedback from the motor driver, $I_m$ is measured, via the hub torque sensor 124.

In step S1330, it is determined whether $I_m > I_n$. If $I_m$ is not greater than $I_n$ (NO at step S1330), the process ends.

If $I_m$ is greater than $I_n$ (YES at step S1330), the process proceeds to step S1340. In step S1340, the driving motor drives the foldable parabolic solar collector to a home position.

In step S1350, the foldable parabolic solar collector changes from an open mode to a closed mode. The process ends when the closed mode has been achieved.

Figure 14:
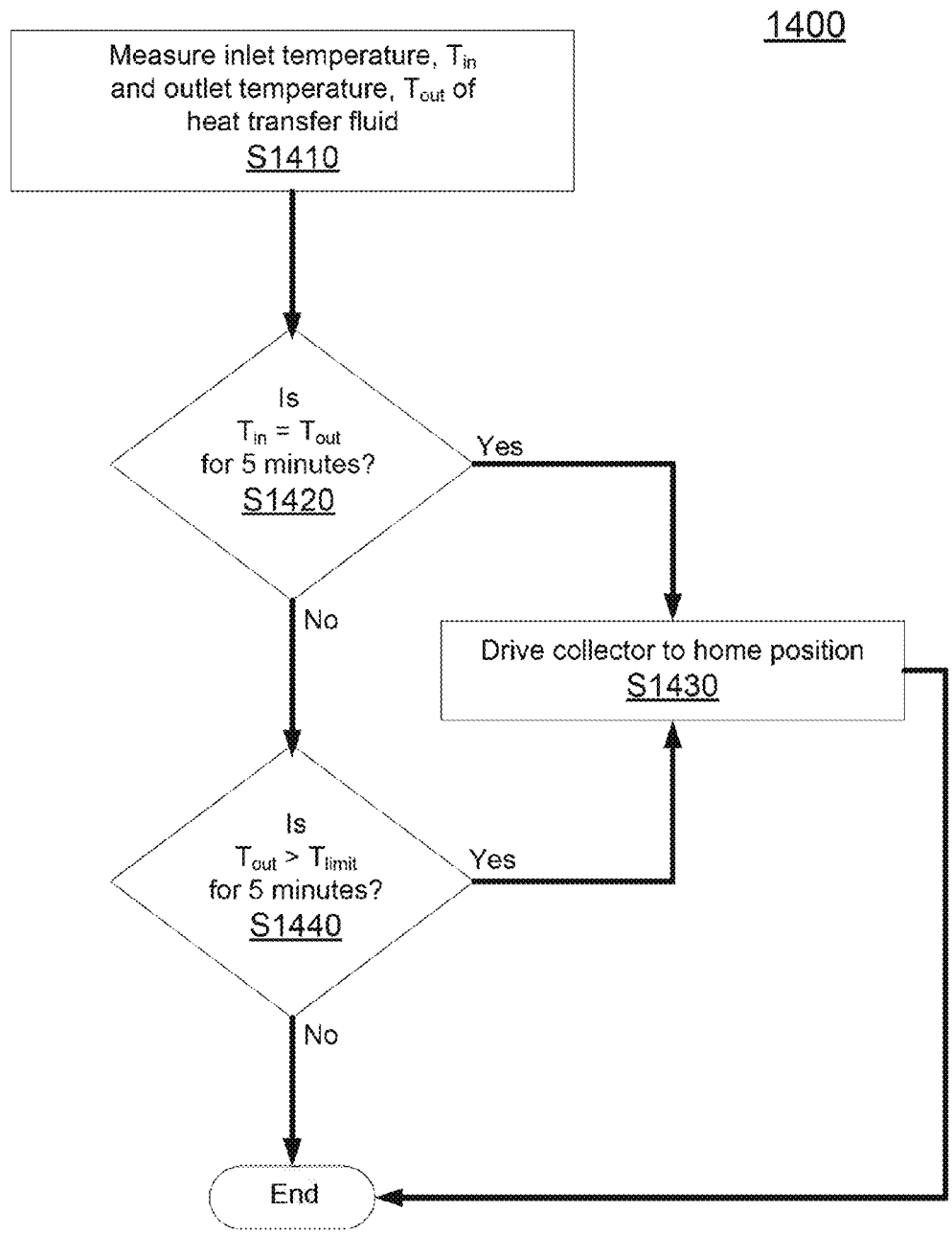
FIG. 14 is an exemplary algorithm for determining a temperature event according to an embodiment.

FIG. 14 is an exemplary algorithm 1400 for determining a temperature event for the heat transfer fluid of the receiver tube 108, in step S1410, an inlet temperature, $T_{in}$ and an outlet temperature, $T_{out}$ of the heat transfer fluid are measured.

In step S1420, it is determined whether $T_{in}$ is equal to $T_{out}$ for at least five minutes. If $T_{in}$ is equal to $T_{out}$ for at least five minutes (YES at step S1420), the process proceeds to step S1430.

In step S1430, the driving motor drives the foldable parabolic solar collector to a home position. After the foldable parabolic solar collector reaches the home position, the process ends.

If $T_{in}$ is not equal to $T_{out}$ for at least five minutes (NO at step S1420), the process proceeds to step S1440. In step S1440, it is determined whether $T_{out}$ is greater than a temperature limit, $T_{limit}$ for at least five minutes. In an embodiment, $T_{limit}$ can be an upper temperature limit in which conditions are still safe to operate.

If $T_{out}$ is greater than $T_{limit}$ for at least five minutes (YES at step S1440), the process proceeds back to step S1430, then the process ends. If $T_{out}$ is not greater than for at least five minutes (NO at step S1440), the process ends.

Multiple advantages can be realized in practicing embodiments described herein. The foldable parabolic solar collector is based on a modular approach in which the collector includes as many panels as needed to reach the required size. A varying number of rows and columns of panels provides a custom foldable parabolic solar collector to fit its intended objectives.

A multiple-panel design also provides an advantage in the event of damage. Embodiments described herein provide replacing a single panel that has been damaged, rather than replacing an entire half of a solar collector.

The wind-tracking capability of the foldable parabolic solar collector provides protection from damaging winds, thereby reducing maintenance costs. A controller initiates changing the collector from an open position to a closed position when winds of a predefined magnitude are detected.

Periodic cleaning of the foldable parabolic solar collector reduces maintenance costs by cleaning the reflective surfaces of dust, sand, and grit. Efficiency of the collector is also improved by maintaining a clean reflective surface. In addition, the cleaning solution can be filtered and reused, thereby reducing the number of times to replace the cleaning solution.

While certain embodiments have been described herein, these embodiments are presented by way of example only, and are not intended to limit the scope of the disclosure. Using the teachings in this disclosure, a person having ordinary skill in the art could modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

For example, multiple parabolic solar collectors could be placed in series and the heat transfer fluid passed from collector to collector in the series. The parabolic solar collectors could be configured with double pass receiver tubes, so that the inlet and outlet for the heat transfer fluid are on a same end of the receiver tube. The various controller components in the ECU may be bundled with the devices which they control, and the signals sent back to the ECU. The functionality of the controllers may also be split between the controlled devices and the ECU.

The invention claimed is:

1. A foldable parabolic solar collector, comprising:
   a first panel having a semi-parabolic shape and a first reflective inner surface;
   a central tube, the first panel being fixed to the central tube;
   a second panel having a semi-parabolic shape and a second reflective inner surface, the second panel being pivotably mounted to the central tube with the second reflective inner surface of the second panel facing the first reflective inner surface of the first panel;
   a hollow receiver tube disposed between the first panel and the second panel, the hollow receiver tube being pivotably mounted to the central tube and configured for carrying a heat transfer fluid;
   a tracking motor coupled to the central tube, the tracking motor configured to rotate the central tube;
   a torque sensor positioned between the tracking motor and the central tube, the torque sensor configured to measure a torque between the tracking motor and the central tube;
   a servomotor connected to the central tube and the second panel, the servomotor configured to pivot the second panel about the central tube;
   a controller having processing circuitry, configured to
      control the tracking motor to direct an axis of symmetry passing through the central tube and the hollow receiver tube toward a position of the sun,
      receive torque data from the torque sensor and determine a torque between the tracking motor and the central tube, and
      control the servomotor to cause the second panel to pivot between an open position, in which the first panel and the second panel form a substantially parabolic shape with the hollow receiver tube disposed along a focal line of the parabolic shape, and a closed position, in which the second panel and the first panel substantially enclose the hollow receiver tube, when it is determined by the controller that the torque between the tracking motor and the central tube exceeds a predetermined torque threshold;

a first light sensor disposed on the first reflective inner surface, the first light sensor configured to measure first solar irradiance corresponding to incident solar irradiance on the first reflective inner surface of the foldable parabolic solar collector; and
a second light sensor disposed on a back side of the foldable parabolic solar collector, the second light sensor configured to measure second solar irradiance corresponding to incident solar irradiance on the back side of the foldable parabolic solar collector,
wherein the controller is further configured to
receive first solar irradiance data from the first light sensor,
control the servomotor to cause the second panel to pivot from the open position to the closed position when the first solar irradiance data is below a first predetermined solar irradiance threshold,
receive second solar irradiance data from the second light sensor, and
control the servomotor to cause the second panel to pivot from the closed position to the open position when the second solar irradiance data is above a second predetermined solar irradiance threshold.

2. The foldable parabolic solar collector according to claim 1, further comprising:
a first temperature sensor disposed at a first end of the hollow receiver tube, the first temperature sensor configured to measure a first temperature corresponding to an outlet temperature of the heat transfer fluid,
wherein the controller is further configured to
receive first temperature data from the first temperature sensor,
determine the outlet temperature of the heat transfer fluid from the first temperature data, and
control the servomotor to cause the second panel to pivot from the open position to the closed position when the outlet temperature of the heat transfer fluid exceeds a predetermined outlet temperature threshold.

3. The foldable parabolic solar collector according to claim 2, further comprising:
a second temperature sensor disposed at a second end of the hollow receiver tube, the second temperature sensor configured to measure a second temperature corresponding to an inlet temperature of the heat transfer fluid,
wherein the controller is further configured to
receive second temperature data from the second temperature sensor,
determine the inlet temperature of the heat transfer fluid from the second temperature data, and
control the servomotor to cause the second panel to pivot from the open position to the closed position when a difference between the outlet temperature and the inlet temperature of the heat transfer fluid is below a predetermined temperature difference.

4. The foldable parabolic solar collector according to claim 1, further comprising:
an electronically-actuatable valve disposed at an end of the central tube;
a pressure rail connected to the electronically-actuatable valve to allow liquid to flow from the electronically-actuatable valve to the pressure rail; and
a plurality of openings along the pressure rail configured to spray a liquid onto the first reflective inner surface of the first panel and the second reflective inner surface of the second panel,
wherein the controller is further configured to actuate the electronically-actuatable valve.

5. The foldable parabolic solar collector according to claim 1, wherein
the hollow receiver tube is enclosed in a glass tube with a space between the hollow receiver tube and the glass tube,
the space between the hollow receiver tube and the glass tube is air evacuated and sealed, and
the hollow receiver tube is coated with an enamel having an absorptivity of at least ninety percent for solar radiation.

6. The foldable parabolic solar collector according to claim 5, wherein the enamel absorbs solar radiation having a wavelength between 0.25 microns and 6 microns.

7. The foldable parabolic solar collector according to claim 1, further comprising:
a plurality of first panels fixed to the central tube; and
a plurality of second panels pivotably mounted to the central tube.

8. The foldable parabolic solar collector according to claim 7, wherein the plurality of first panels and the plurality of second panels comprise sheets mounted via a web of structurally-rigid links.

9. The foldable parabolic solar collector according to claim 1, wherein the torque determined between the tracking motor and the central tube is measured via a current feedback from the tracking motor.

10. A foldable parabolic solar collector, comprising:
a first panel having a semi-parabolic shape and a first reflective inner surface;
a central tube, the first panel being fixed to the central tube;
a second panel having a semi-parabolic shape and a second reflective inner surface, the second panel being pivotably mounted to the central tube with the second reflective inner surface of the second panel facing the first reflective inner surface of the first panel;
a hollow receiver tube disposed between the first panel and the second panel, the hollow receiver tube being pivotably mounted to the central tube and configured for carrying a heat transfer fluid;
a tracking motor coupled to the central tube, the tracking motor configured to rotate the central tube;
a torque sensor positioned between the tracking motor and the central tube, the torque sensor configured to measure a torque between the tracking motor and the central tube;
a servomotor connected to the central tube and the second panel, the servomotor configured to pivot the second panel about the central tube;
a controller having processing circuitry, configured to
control the tracking motor to direct an axis of symmetry passing through the central tube and the hollow receiver tube toward a position of the sun,
receive torque data from the torque sensor and determine a torque between the tracking motor and the central tube, and
control the servomotor to cause the second panel to pivot between an open position, in which the first panel and the second panel form a substantially parabolic shape with the hollow receiver tube disposed along a focal line of the parabolic shape, and a closed position, in which the second panel and the first panel substantially enclose the hollow receiver tube, when it is determined by the controller that the torque between the tracking motor and the central tube exceeds a predetermined torque threshold;

a first temperature sensor disposed at a first end of the hollow receiver tube, the first temperature sensor configured to measure a first temperature corresponding to an outlet temperature of the heat transfer fluid; and a second temperature sensor disposed at a second end of the hollow receiver tube, the second temperature sensor configured to measure a second temperature corresponding to an inlet temperature of the heat transfer fluid, wherein the controller is further configured to receive first temperature data from the first temperature sensor, determine the outlet temperature of the heat transfer fluid from the first temperature data, control the servomotor to cause the second panel to pivot from the open position to the closed position when the outlet temperature of the heat transfer fluid exceeds a predetermined outlet temperature threshold, receive second temperature data from the second temperature sensor, determine the inlet temperature of the heat transfer fluid from the second temperature data, and control the servomotor to cause the second panel to pivot from the open position to the closed position when a difference between the outlet temperature and the inlet temperature of the heat transfer fluid is below a predetermined temperature difference.

11. The foldable parabolic solar collector according to claim 10, further comprising:

a first light sensor disposed on the first reflective inner surface, the first light sensor configured to measure first solar irradiance corresponding to incident solar irradiance on the first reflective inner surface of the foldable parabolic solar collector, wherein the controller is further configured to receive first solar irradiance data from the first light sensor, and control the servomotor to cause the second panel to pivot from the open position to the closed position when the first solar irradiance data is below a first predetermined solar irradiance threshold.

12. The foldable parabolic solar collector according to claim 10, further comprising:

an electronically-actuatable valve disposed at an end of the central tube;

a pressure rail connected to the electronically-actuatable valve to allow liquid to flow from the electronically-actuatable valve to the pressure rail; and a plurality of openings along the pressure rail configured to spray a liquid onto the first reflective inner surface of the first panel and the second reflective inner surface of the second panel, wherein the controller is further configured to actuate the electronically-actuatable valve.

13. The foldable parabolic solar collector according to claim 10, wherein the hollow receiver tube is enclosed in a glass tube with a space between the hollow receiver tube and the glass tube, the space between the hollow receiver tube and the glass tube is air evacuated and sealed, and the hollow receiver tube is coated with an enamel having an absorptivity of at least ninety percent for solar radiation.

14. The foldable parabolic solar collector according to claim 13, wherein the enamel absorbs solar radiation having a wavelength between 0.25 microns and 6 microns.

15. The foldable parabolic solar collector according to claim 10, further comprising:

a plurality of first panels fixed to the central tube; and a plurality of second panels pivotably mounted to the central tube.

16. The foldable parabolic solar collector according to claim 15, wherein the plurality of first panels and the plurality of second panels comprise sheets mounted via a web of structurally-rigid links.

17. The foldable parabolic solar collector according to claim 10, wherein the torque determined between the tracking motor and the central tube is measured via a current feedback from the tracking motor.

* * * * *